United States Patent
Jaeger et al.

(10) Patent No.: US 10,918,025 B2
(45) Date of Patent: Feb. 16, 2021

(54) METHOD FOR ASSISTING DURING FELLING OF A TREE, AND SYSTEM FOR ASSISTING DURING FELLING OF A TREE

(71) Applicant: Andreas Stihl AG & Co. KG, Waiblingen (DE)

(72) Inventors: Dirk Jaeger, Hatzfeld (DE); Harald Mang, Winnenden (DE); Bettina Maier, Tuebingen (DE); Martin Tippelt, Waldenbuch (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 217 days.

(21) Appl. No.: 16/026,892

(22) Filed: Jul. 3, 2018

(65) Prior Publication Data

US 2019/0011271 A1    Jan. 10, 2019

(30) Foreign Application Priority Data

Jul. 4, 2017 (EP) ..................... 17179673

(51) Int. Cl.
| A01G 23/00 | (2006.01) |
| A01G 23/099 | (2006.01) |
| A01G 23/08 | (2006.01) |
| G01C 21/34 | (2006.01) |
| B27B 17/00 | (2006.01) |
| G01C 15/00 | (2006.01) |

(52) U.S. Cl.
CPC ............ *A01G 23/00* (2013.01); *A01G 23/08* (2013.01); *A01G 23/099* (2013.01); *G01C 21/3407* (2013.01); *B27B 17/00* (2013.01); *G01C 15/00* (2013.01)

(58) Field of Classification Search
CPC ...... A01G 23/00; A01G 23/003; A01G 23/02; A01G 23/08; A01G 23/091; A01G 23/093; A01G 23/095; A01G 23/099; B27B 1/00; B27B 1/005; B27B 1/007
See application file for complete search history.

(56) References Cited

U.S. PATENT DOCUMENTS

| 7,315,794 B1 | 1/2008 | Willis |
| 2006/0096667 A1 | 5/2006 | Stevens et al. |
| 2019/0090437 A1* | 3/2019 | Lennings ............... G06Q 10/06 |

FOREIGN PATENT DOCUMENTS

| DE | 42 32 412 A1 | 3/1994 |
| EP | 1 757 184 A1 | 2/2007 |
| RU | 2 489 844 C1 | 8/2013 |
| WO | WO 2014/120898 A1 | 8/2014 |
| WO | WO 2017/009752 A1 | 1/2017 |

* cited by examiner

*Primary Examiner* — Matthew Katcoff
(74) *Attorney, Agent, or Firm* — Crowell & Moring LLP

(57) ABSTRACT

A method assists during felling of a tree. The method includes the steps of: providing a property of the tree and/or a property of an environment of the tree; obtaining felling information related to an ideal felling direction of the tree based on the provided property; and outputting the obtained felling information.

8 Claims, 2 Drawing Sheets

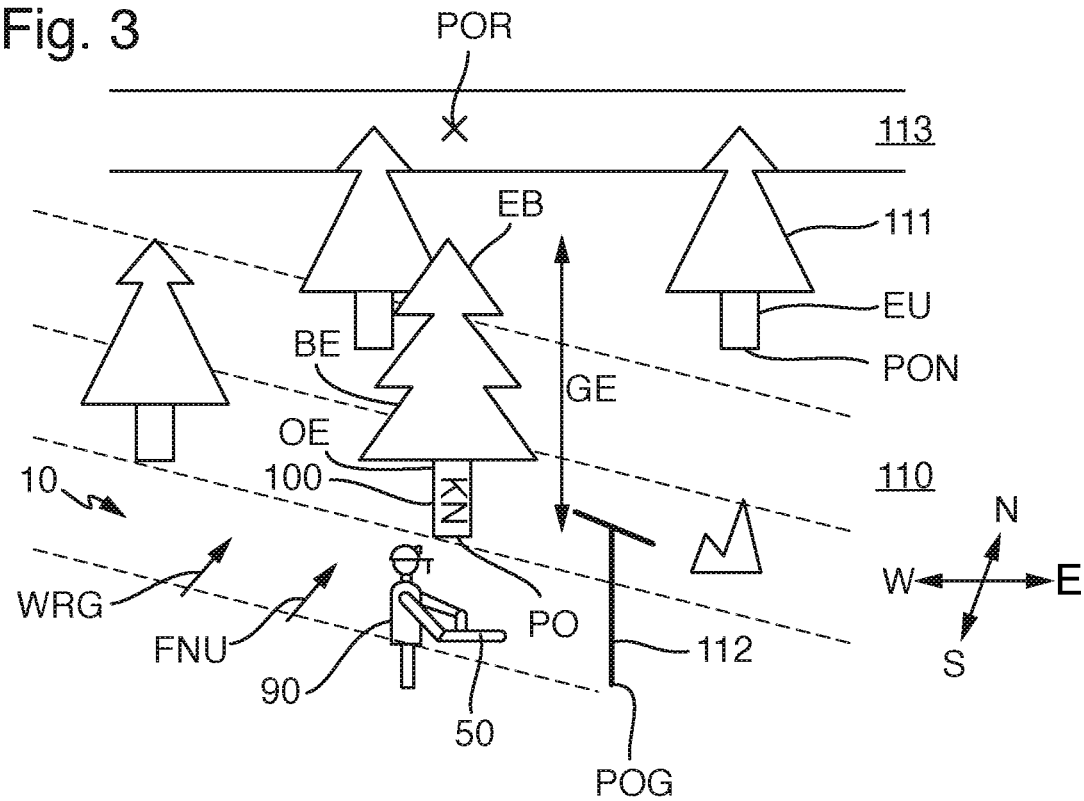
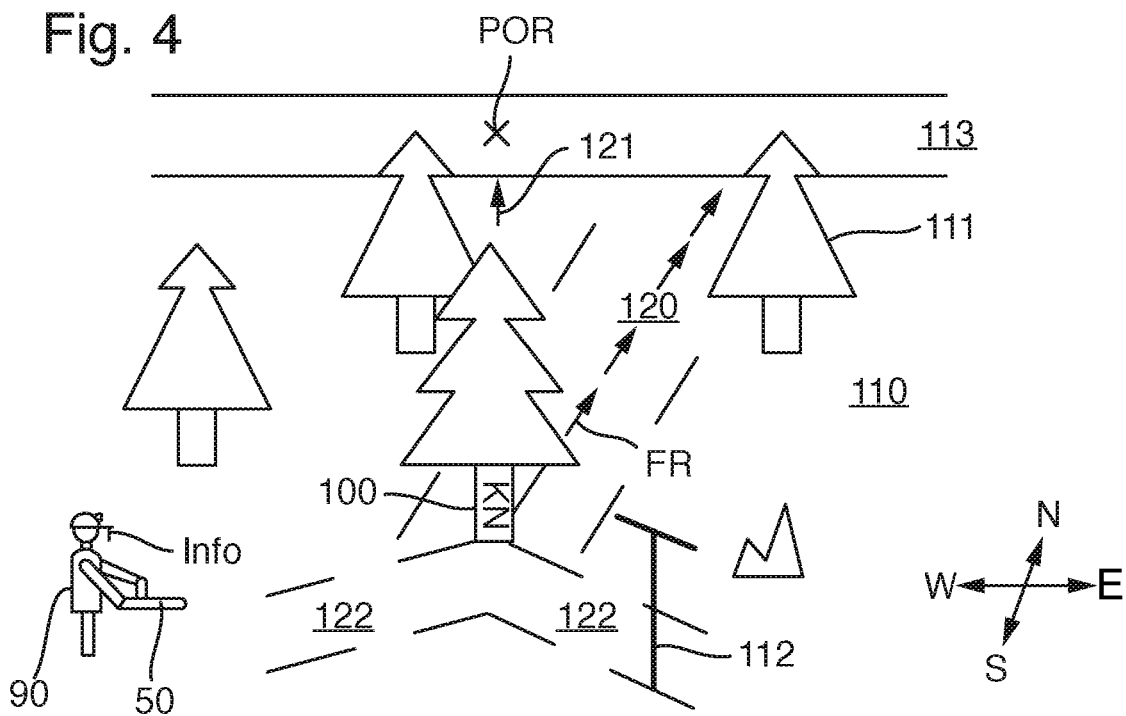

METHOD FOR ASSISTING DURING FELLING OF A TREE, AND SYSTEM FOR ASSISTING DURING FELLING OF A TREE

CROSS REFERENCE TO RELATED APPLICATION

This application claims priority under 35 U.S.C. § 119 from German Patent Application No. EP 17179673.3, filed Jul. 4, 2017, the entire disclosure of which is herein expressly incorporated by reference.

BACKGROUND AND SUMMARY OF THE INVENTION

The invention relates to a method for assisting during felling of a tree, and to a system for assisting during felling of a tree.

A method for assisting during felling of a tree and a system for assisting during felling of a tree are known.

The invention is based on the problem of providing a method for assisting during felling of a tree and a system for assisting during the felling of a tree, which method and system each improve safety during felling, make it easier to prevent undesired damage, in particular to the tree, during felling and/or allow simple further processing of the tree.

The invention solves this problem by providing a method and system for assisting during felling of a tree in accordance with claimed embodiments of the invention. Advantageous developments and/or configurations of the invention are described and claimed herein.

The, in particular automatic, method according to the invention for assisting or supporting during felling of a tree comprises the steps: a) providing, in particular automatically providing, or obtaining a property of the tree and/or a property of an environment of the tree; b) obtaining, in particular automatically obtaining, felling information related to an ideal felling direction of the tree based on the provided property; and c) outputting, in particular automatically outputting, the obtained felling information.

The method allows safety to be improved during felling, in particular for a forestry worker executing the felling. In addition or as an alternative, the method allows it to be made easier to prevent undesired damage, in particular to the tree, during felling. Further in addition or as an alternative, the method allows simple further processing of the tree. Therefore, a maximum economic profit can be made from the tree.

A deviation from the ideal felling direction can lead to the tree falling and/or becoming trapped on something in an undesired manner. Furthermore, a deviation can lead to the tree, in particular its trunk, ripping and/or splitting. In addition, a deviation can lead to the tree being in an unfavourable position. This may reduce an economic profit which can be made from the tree. By virtue of outputting the felling information, a risk of these disadvantages occurring can be reduced or even avoided.

In particular, the ideal felling direction can be obtained. The felling information can be based on the obtained felling direction or can be obtained based on the obtained felling direction. The felling direction can include or be a compass direction.

The tree can be standing, in particular living.

The property can include or be a value and/or an amount.

The step b) can be executed at the same time as step a) and/or after the said step a). The step c) can be executed at the same time as step b) and/or after the said step b).

In one development of the invention, the step a) includes: receiving, in particular receiving in a cable-free or wire-free manner, or calling up the property, in particular from a database and/or a network, in particular from the Internet. In particular, the database can include a forestry file which can include the property.

In one configuration of the invention, the method comprises the step: obtaining, in particular specifying or identifying, a position and/or a marking of the tree. The step a) includes: receiving the property based on or depending on the obtained position and/or the obtained marking. In particular, the property of the tree at this position and/or the property of the environment of this position can be received based on the obtained position. The property of the tree with this marking and/or the property of the environment of this tree can be received based on the obtained marking. In addition or as an alternative, the position of the tree with this marking can be received based on the obtained marking. The property can be received based on the received position. In particular, the marking can be made on the tree, in particular by the forestry worker. The marking can include at least one symbol, in particular a letter and/or a number, and/or a code, in particular a bar code and/or a QR code.

In one development of the invention, the step a) includes: identifying the property using optical identification, in particular in combination with photogrammetry, and/or inertial measurement and/or a spirit level and/or a compass and/or local position determination and/or satellite position determination. In particular, the tree and/or the environment of the tree can be described by position coordinates and/or orientation angles. The position coordinates and/or the orientation angles can be identified by in each case at least one of the said techniques. In particular, optical identification can be performed from different identification positions and/or with depth information. In particular, the above-described marking can be obtained using optical identification. In particular, the above-described position can be obtained using the local position determination and/or the satellite position determination.

In one development of the invention, the property of the tree includes a geometry of the tree and/or a surface characteristic of the tree and/or a tree species of the tree or is a specific property of this kind of the tree. In addition or as an alternative, the property of the environment of the tree includes at least one position of at least one adjacent tree and/or at least one position of at least one hazardous point and/or at least one position of at least one logging trail and/or a shape and/or a slope of the environment and/or a wind direction and/or a wind speed or is a specific property of this kind of the environment. A felling response of the tree can depend on or at least be influenced by the geometry, the surface characteristic and/or the tree species of the tree. In particular, the geometry of the tree can include or be a height and/or a diameter and/or a curvature and/or a slope and/or a contour and/or a shape and/or a branch distribution and/or a crown weight of the tree or its trunk. The geometry of the tree can be identified, in particular, by in each case at least one of the above-described techniques for identifying the property. In particular, the tree species and/or a state of health of the tree can be identified, in particular obtained, from the surface characteristic. The surface characteristic and/or the state of health can include damage, in particular wood damage. The state of health can include a pest infestation and/or rotting. The tree species can be oak or spruce or pine or beech or another tree species. The surface characteristic and/or the tree species can be identified, in particular, by the above-described optical identification. In particular, a fibre orientation of the tree or of its trunk can be identified, in particular obtained, from the geometry and/or the surface characteristic of the tree. The felling response of the tree can depend on or at least be influenced by the wind direction and/or the wind speed. A response of the tree during felling or after felling or further processing of the tree can depend on or at least be influenced by the position of the adjacent tree, the position of the hazardous point, the position of the logging trail, the shape of the environment and/or the slope of the environment. The logging trail can be used to collect the felled tree. The shape of the environment can be flat or rugged. In particular, the environment can include rocks and/or cliffs. The slope of the environment can include a gradient and/or an inclined direction. The position of the adjacent tree, the position of the hazardous point, the position of the logging trail, the shape of the environment and/or the slope of the environment can be identified, in particular, by in each case at least one of the above-described techniques for identifying the property. The wind direction and/or the wind speed can be received.

In one development of the invention, the step b) includes: obtaining a free felling area for the tree and/or a logging direction to a logging trail and/or a felling retreat for the forestry worker based on the provided property. The felling information related to the ideal felling direction of the tree is obtained based on the obtained free area and/or the obtained logging direction and/or the obtained felling retreat. In other words: obtaining the felling direction of the tree in such a way that the tree does not fall on an adjacent tree and/or a hazardous point in the environment, in particular during felling, and/or that the tree falls in the direction of a logging trail and/or that the tree leaves free at least one logging retreat during felling. The felling area can be referred to as a felling corridor. The felling retreat can or should run inclined through 45° in relation to the felling direction.

In one development of the invention, the felling information includes: the ideal felling direction of the tree and/or at least a part of an ideal course of at least one cut to be executed in the tree for felling the tree in the ideal felling direction and/or at least one ideal position and/or at least one ideal orientation or alignment of a cutting apparatus executing the cut. In particular, the felling information can include where and/or how execution of the cut can or should be started and/or terminated on the tree. The ideal position can be a starting position or an end position. The ideal orientation can be a starting orientation or an end orientation. In particular, the at least one part of the ideal course of the at least one cut to be executed can be obtained based on the ideal felling direction. The ideal position and/or the ideal orientation can be obtained based on the at least one part of the ideal course. The part of the course can be, in particular, a start, in particular a starting line, or an end, in particular an end line, of the course. The at least one cut to be executed can be selected from a group, the group comprising: a kerf lower cut, a kerf upper cut and a felling cut. In particular, the kerf lower cut, the kerf upper cut and the felling cut in this order or the kerf upper cut, the kerf lower cut and the felling cut in this order can form a cutting sequence. The kerf lower cut and the kerf upper cut can or should meet exactly at a kerf chord and neither of the two cuts should go beyond the other. The kerf lower cut and the kerf upper cut can form a kerf or a felling wedge. The kerf can determine a falling direction of the tree and can be used to enable tipping of the tree in the desired felling direction. In addition, the kerf upper cut or its course can or should be at least at an angle of 45° in relation to the kerf lower cut or its course in order to create a sufficiently large opening in this way. In this way, it is possible to ensure that, during felling, the tree cannot sit with the kerf roof on the kerf base and the trunk cannot rip along the longitudinal axis in this sitting position. The felling cut can or should be started or made one tenth of the diameter of the trunk, but at least 3 centimetres (cm), laterally next to the kerf chord. This horizontal offset can be called the hinge width. Furthermore, the felling cut can or should be started one tenth of the diameter of the trunk, but at least 3 cm, above the kerf chord. This vertical offset can be called the hinge step. An end line of the felling cut, which can be called the hinge chord, can or should run parallel to the kerf chord. The hinge width and hinge step can form a hinge which can hold the tree during felling work and safely guide the said tree during felling. Steep cutting of the hinge width and/or the hinge step can lead to a deviation from the intended felling direction. In addition, the felling information can include apparatus information. The apparatus information can include: a power of a motor in the case of a motor-driven cutting apparatus, a length of a blade of the cutting apparatus and/or whether and which other auxiliary appliances, such as wedges or a felling lever, should be used for felling the tree.

In one refinement of the invention, the felling information is output using optics and/or acoustics and/or haptics. This can provide the forestry worker with a relatively good perception of the felling information. In particular, the output by optics can include a display. The output by optics can include superimposition or projection of the felling information into a field of view of the forestry worker, in particular in front of the tree. The output by optics can include projection of the felling information onto the tree. The output by haptics can include vibration.

In one development of the invention, the method comprises the steps: d) identifying, in particular automatically identifying, at least a part of an, in particular actual, course of a cut in the tree for felling the tree during execution thereof and/or identifying a position and/or an orientation of a cutting apparatus executing the cut during execution thereof; e) comparing, in particular automatically comparing, the identified part of the course to an obtained part of an ideal course of a cut to be executed in the tree for felling the tree in the ideal felling direction and/or comparing the identified position and/or the identified orientation of the cutting apparatus to an obtained ideal position and/or an obtained ideal orientation of the cutting apparatus for executing the cut to be executed, in particular during step d); and f) obtaining, in particular automatically obtaining, and outputting, in particular automatically outputting, cutting information for executing the cut based on the comparison during step d). This can allow a deviation from the at least one part of the ideal course of the cut to be executed to be avoided during execution of the cut or to return to the ideal course in the event of a deviation. The cutting information can include an instruction to return, in particular a position instruction and/or an orientation instruction. In addition or as an alternative, the cutting information can include an instruction to terminate the execution of the step. The cutting information can be output in the same way as the felling information. The part of the course of the cut and/or the position and/or the orientation of the cutting apparatus can be identified by the above-described techniques for identifying the property. The part of the course can be obtained based on the identified position and/or the identified orientation of the cutting apparatus.

The invention further relates to a system for assisting during felling of the tree. The system can be configured, in particular, for executing the above-described method. The system according to the invention has a provision device, a determination device and an output device. The provision device is configured to provide the property of the tree and/or the property of the environment of the tree. The determination device is configured to obtain the felling information related to the ideal felling direction of the tree based on the provided property. The output device is configured to output the obtained felling information.

The system can allow the same advantages as the above-described method.

In particular, the determination device can include or be a processor, in particular a CPU.

In one development of the invention, the provision device includes a receiver device configured to receive the property. The receiver unit can include a mobile radio receiver unit, in particular a UMTS, WLAN and/or Bluetooth receiver unit, or a receiver unit based on another technology.

In one development of the invention, the provision device includes an identification device configured to identify the property. The identification device includes a camera and/or an inertial measuring unit and/or the spirit level and/or the compass and/or a local position determination device and/or a satellite position determination device. The camera can include a stereo camera and/or a TOF camera for depth information. TOF cameras are 3D camera systems which can measure distances using the time of flight method. The inertial measuring unit can include at least one acceleration sensor and/or at least one rate of rotation sensor. The spirit level can be configured as an electrical or digital spirit level. The compass can be configured as an electrical or digital compass. The local position determination device can advantageously be based on one or more different technologies, such as distance measurements from node points, optical signals, radio waves, magnetic fields, acoustic signals, ultra-wideband, Bluetooth, WLAN, ultrasound and/or RFID. The satellite position determination device can be configured for one or more satellite position determination systems such as NAVSTAR GPS, GLONASS, Galileo and/or BeiDou. In addition or as an alternative, the satellite position determination device can be configured as an RTK (real time kinematic) satellite position determination device and/or as a differential satellite position determination device.

In one development of the invention, the output device includes a display and/or a sound generator and/or a vibration device or is one of the above. In particular, the display can be configured to display the felling information in the field of view of the forestry worker, in particular in front of the tree, and/or to project or superimpose the said felling information into the said field of view, in particular before and/or during execution of the felling by the forestry worker. The display can be called a head-up display. This can be called virtual reality and/or augmented reality.

In one development of the invention, the system includes a protective helmet, a face shield and/or ear protection, safety goggles, a protective glove, a smartwatch, an armband or a wristband or a bracelet, whereon the provision device and/or the output device are/is disposed. This allows the provision device and/or the output device to be worn on the body of the forestry worker. Therefore, the forestry worker can carry, in particular, the identification device, if present, with him. In other words, the identification device can identify what the forestry worker is currently working on. In particular, the display, if present, can be configured to display the felling information on or project the said felling information into a visor of the protective helmet, of the face shield and/or ear protection and/or of the safety goggles, if present. The display can be called a head-mounted display.

In one development of the invention, the system includes the cutting apparatus configured to execute the at least one cut in the tree for felling the tree. In particular, the cutting apparatus can include or be a saw. The saw can include or be a motorized saw and/or a chainsaw. In particular, the cutting apparatus can be configured as a hand-held cutting apparatus. Hand-held cutting apparatus can mean that the cutting apparatus can have a maximum mass of 50 kilograms (kg), in particular of 20 kg, in particular of 10 kg. The provision device and/or the output device can be disposed on the cutting apparatus.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 is a further perspective view of the system of FIG. 2 when providing a property of a tree to be felled and a property of an environment of the tree.

FIG. 4 is a further perspective view of the system of FIG. 2 when outputting felling information.

DETAILED DESCRIPTION OF THE DRAWINGS

Figure 1:
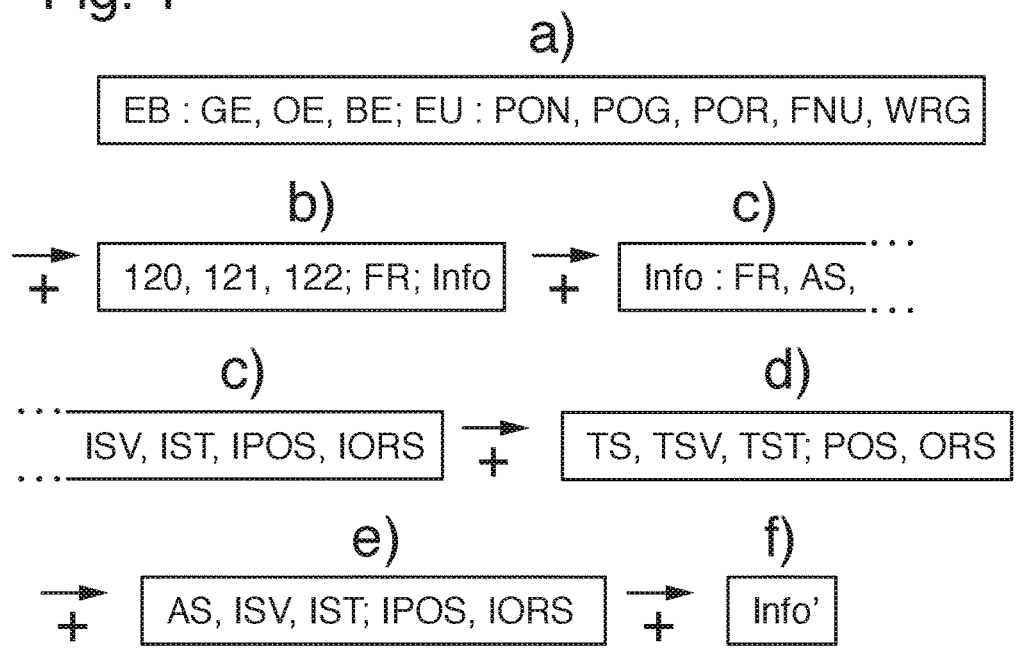
FIG. 1 is a flowchart of an exemplary method according to the invention.
Figure 5:
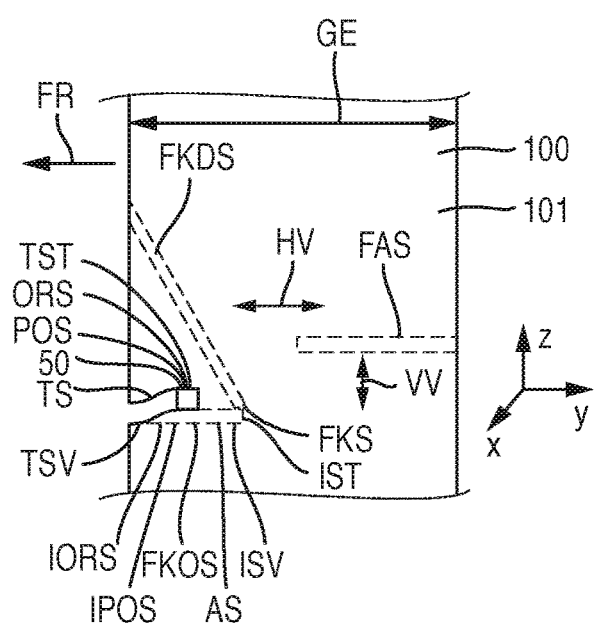
FIG. 5 is a view of a longitudinal section of the tree of FIG. 3 during felling.

FIG. 1 shows a method for assisting during felling of a, in particular standing, tree 100 or its trunk 101, as can be seen in FIGS. 3 to 5. The method comprises the steps: a) providing a property EB of the tree 100 and a property EU of an environment 101 of the tree 100; b) obtaining felling information Info related to an ideal felling direction FR of the tree 100 based on the provided property EB, EU; and c) outputting the obtained felling information Info. In alternative exemplary embodiments, it may be sufficient when step a) can include the following: providing either the property of the tree or the property of the environment of the tree.

FIGS. 2 to 5 show a system 10 for assisting during felling of the tree 100. The system 10 is configured, in particular, for executing the above-described method. The system 10 has a provision device 20, a determination device 30 and an output device 40. The provision device 20 is configured to provide the property EB of the tree 100 and the property EU of the environment 110 of the tree 100. The determination device 30 is configured to obtain the felling information Info related to the ideal felling direction FR of the tree 100 based on the provided property EB, EU. The output device 40 is configured to output the obtained felling information Info. In alternative exemplary embodiments, it may be sufficient when the provision device can be configured to provide either the property of the tree or the property of the environment of the tree.

Specifically, the provision device 20 includes an identification device 22. The identification device 22 is configured to identify the property EB, EU. In the exemplary embodiment shown, the identification device 22 includes a camera 23 and a satellite position determination device 28. In alternative exemplary embodiments, the identification device can include either the camera or the satellite position determination device. In alternative exemplary embodiments, the identification device can further include, in addition or as an alternative, an inertial measuring unit, a spirit level, a compass and/or a local position determination device.

Furthermore, the provision device 20 includes a receiver device 21. The receiver device 21 is configured to receive the property EB, EU. In the exemplary embodiment shown, the receiver device is configured as a mobile radio antenna. In alternative exemplary embodiments, the provision device can include either the identification device or the receiver device.

Figure 2:
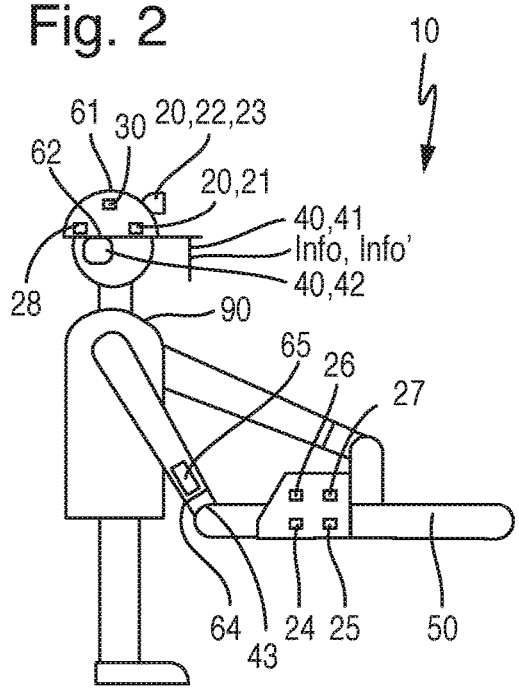
FIG. 2 is a perspective view of an exemplary system according to the invention.

In addition, the system 10 has a protective helmet 61, a face shield and/or ear protection 62, a protective glove 64 and a smartwatch 65. In the exemplary embodiment shown, the camera 23, the satellite position determination device 28 and the receiver device 21 are disposed, in particular integrated, on the protective helmet 61, as can be seen in FIG. 2. In alternative exemplary embodiments, the provision device can, in addition or as an alternative, be disposed on the face shield and/or ear protection, the protective glove and/or the smartwatch. In alternative exemplary embodiments, the system can further include safety goggles, an armband or a wristband or a bracelet, whereon the provision device can be disposed.

In addition, the determination device 30 is disposed on the, or in the, protective helmet 61.

Accordingly, the step a) includes: identifying the property EB, EU using optical identification, in particular using the camera 23, and satellite position determination, in particular using the satellite position determination device 28. In alternative exemplary embodiments, it may be sufficient when step a) includes: identifying the property either using optical identification or using satellite position determination. In alternative exemplary embodiments, the step a) can further include, in addition or as an alternative: identifying the property using inertial measurement and/or a spirit level and/or a compass and/or local position determination.

In addition, the step a) includes: receiving the property EB, EU, in particular using the receiver device 21.

Specifically, the method includes the step: obtaining a position PO, in particular using the satellite position determination device 28, and a marking KN of the tree 100, in particular using the camera 23. The step a) includes: receiving the property EB, EU based on the obtained position PO and the obtained marking KN. In alternative exemplary embodiments, the method can include the step: obtaining either the position or the marking of the tree. Accordingly, the step a) can include: receiving the property based on either the obtained position or the obtained marking.

In the exemplary embodiment shown, a forestry worker 90 wears the protective helmet 61, as can be seen in FIG. 3. The forestry worker 90, in particular firstly, walks around the tree 100. In the process, the property EB of the tree 100 is optically identified from various identification positions using the camera 23.

Specifically, the property EB of the tree 100 includes a geometry GE of the tree 100 and a surface characteristic OE of the tree 100 and a tree species BE of the tree 100. In alternative exemplary embodiments, it may be sufficient when the property of the tree can include either the geometry or the surface characteristic or the tree species. The state of health of the tree 100 is identified, in particular obtained, from the surface characteristic OE. Fibre orientation of the tree 100 or of its trunk 101 is identified, in particular obtained, from the geometry GE and the surface characteristic OE of the tree.

In addition, the marking KN of the tree 100 is obtained using the camera 23 while the said forestry worker is walking around. The property EU of the environment 110 of the tree 100 is received based on the obtained marking KN. In alternative exemplary embodiments, the property of the tree can, in addition or as an alternative, be received based on the obtained marking.

The position PO of the tree 100 is further additionally obtained using the satellite position determination device 28. The property of the environment 110 of the tree is received based on the obtained position PO. In alternative exemplary embodiments, the property of the tree can, in addition or as an alternative, be received based on the obtained position.

Specifically, the, in particular received, property EU of the tree 100 includes a wind direction and a wind speed WRG.

In addition, the forestry worker 90, in particular secondly, walks around in the environment 110 of the tree. In the process, the property EU of the environment 110 is optically identified from various identification positions using the camera 23.

Specifically, the, in particular identified, property EU of the environment 110 includes at least one position PON of at least one adjacent tree 111 and/or at least one position POG of at least one hazardous point 112 and/or at least one position POR of at least one logging trail 113 and/or a shape and/or a slope FNU of the environment.

In alternative exemplary embodiments, it may be sufficient when the property of the environment can include either the at least one position of at least one adjacent tree or the at least one position of at least one hazardous point or the at least one position of at least one logging trail or the shape and/or the slope of the environment or the wind direction and/or the wind speed.

In the exemplary embodiment shown, there are three adjacent trees 111 in the form of protected trees in the environment 110 of the tree 100, as can be seen in FIGS. 3 and 4. Furthermore, there is a hazardous point 112 in the form of a electricity pylon in the environment 110. In addition, there is a logging trail 113 in the environment 110, at the top or in compass direction north in FIGS. 3 and 4. The shape FNU of the environment 110 is further flat, with the exception of a rock. In addition, the environment is sloping, to the top right or in compass direction north-east, as indicated by dashed contour lines, in FIGS. 3 and 4. Furthermore, there is a wind direction WRG, to the top right or in compass direction north-east in FIGS. 3 and 4.

The geometry GE, the surface characteristic OE and the tree species BE do not give rise to any particular felling response of the tree 100.

However, the geometry GE of the tree 100 includes a height of the tree 100 and a value of the height GE is relatively larger than a distance between the position PO of the tree 100 and the positions PON of the adjacent trees 111, a distance between the position PO and the position POG of the hazardous point 112 and a distance from the rock. Furthermore, one of the positions PON of one of the adjacent trees 111 is between the position PO of the tree 100 and a next position POR of the logging trail 113.

Therefore, in the event of a non-ideal felling direction, in particular in the event of felling directly in the direction of the logging trail 113, there is risk of the tree 100 falling onto one of the adjacent trees 111, the hazardous point 112 or the rock. Furthermore, there is a risk of the wind changing or at least influencing a direction of the tree 100 during felling.

On account of the gradient of the environment 110, there is also a risk of the tree 100 or its trunk 101 rolling away and/or slipping away in the case of an unfavourable position after felling, in particular after removal of its crown and/or of branches.

Therefore, a response of the tree 100 during felling and after felling and further processing of the tree 100 depends on the positions PON of the adjacent trees 111, the position POG of the hazardous point 112, the position POR of the logging trail 113, the shape and/or the slope FNU of the environment 110 and/or the wind direction and/or the wind speed WRG.

Specifically, the step b) includes: obtaining a free felling area 120 for the tree 100 and a logging direction 121 to the logging trail 113 and a felling retreat 122 for the forestry worker 90 based on the provided property EB, EU. The felling information Info related to the ideal felling direction FR of the tree 100 is obtained based on the obtained free area 120 and the obtained logging direction 121 and the obtained felling retreat 122. Specifically, two felling retreats 122 are obtained, which are each intended to run or run inclined through 45° in relation to the felling direction FR. In alternative exemplary embodiments, the step b) can include: either obtaining the free felling area or the logging direction or the logging retreat. Accordingly, the felling information can be obtained based on either the obtained free area or the obtained logging direction or the obtained felling retreat.

In the exemplary embodiment shown, the obtained ideal felling direction FR is to the top right or in compass direction north-east in FIGS. 3 and 4. Therefore, the tree 100 can fall into a gap between two of the adjacent trees 111. In the process, the tree 100 can fall with the wind. After felling, the tree 100 can lie perpendicular to the gradient of the environment 110 and therefore securely. Furthermore, the ideal felling direction FR is at a relatively small angle in relation to the logging direction 121.

The output device for outputting the obtained felling information includes a display 41, a sound generator 42 and a vibration device 43. In alternative exemplary embodiments, it may be sufficient when the output device can include either the display or the sound generator or the vibration device.

In the exemplary embodiment shown, the display 41 is disposed, in particular integrated, on the protective helmet 61, as can be seen in FIG. 2. Specifically, the protective helmet 61 has a visor. The display 41 is configured to display the felling information Info on the visor of the protective helmet 61 in a field of view of the forestry worker 90, in particular in front of the tree 100, and/or to project the said felling information into the field of view in front of the tree 100. In alternative exemplary embodiments, the display can be disposed elsewhere.

Furthermore, in the exemplary embodiment shown, the sound generator 42 is disposed, in particular integrated, on the face shield and/or ear protection 62. In alternative exemplary embodiments, the sound generator can be disposed elsewhere.

In the exemplary embodiment shown, the vibration device 43 is also disposed, in particular integrated, on a cutting apparatus 50. In alternative exemplary embodiments, the vibration device can be disposed elsewhere.

Accordingly, the felling information Info is output using optics, acoustics and haptics in step c). In alternative exemplary embodiments, it can be sufficient when the felling information can be output using either optics or acoustics or haptics.

Specifically, the felling information Info includes: the ideal felling direction FR of the tree 100 and at least a part IST of an ideal course ISV of at least one cut AS to be executed in the tree 100 for felling the tree 100 in the ideal felling direction FR and at least one ideal position IPOS and at least one ideal orientation IORS of the cutting apparatus 50 executing the cut AS, as can be seen in FIGS. 4 and 5. The at least one part IST of the ideal course ISV of the at least one cut AS to be executed is obtained based on the ideal felling direction FR, in particular using the determination device 30. The ideal position IPOS and the ideal orientation IORS are obtained based on the at least one part IST of the ideal course ISV, in particular using the determination device 30. In alternative exemplary embodiments, it may be sufficient when the felling information can include: either the ideal felling direction or the at least one part of the ideal course of the cut to be executed or the ideal position or the ideal orientation of the cutting apparatus executing the cut.

In the exemplary embodiment shown, the felling information Info specifically includes where and how execution of the cut AS on the tree 100 or its trunk 101 should be started. In particular, the felling information Info is displayed in the field of view of the forestry worker 90, in particular in front of the tree 100.

Specifically, a kerf lower cut FKOS, a kerf upper cut FKDS and a felling cut FAS are to be executed, as can be seen in FIG. 5. The kerf lower cut FKOS and the kerf upper cut FKDS meet exactly at a kerf chord KFS and neither of the two cuts goes beyond the other. The kerf lower cut FKOS and the kerf upper cut FKDS form a kerf. The kerf determines the falling direction of the tree 100. The felling cut FAS has a horizontal offset HV in relation to the kerf chord FKS. The horizontal offset HV can be called the hinge width. Furthermore, the felling cut FAS has a vertical offset VV in relation to the kerf chord FKS. The vertical offset VV can be called the hinge step. Steep cutting of the hinge width and/or the hinge step can lead to a deviation from the ideal felling direction FR.

In the exemplary embodiment shown, the geometric property GE additionally includes a diameter of the tree 100 or its trunk 101. The kerf lower cut FKOS, the kerf upper cut FKDS and the felling cut FAS or the courses are obtained based on the diameter GE of the tree 100.

Furthermore, the system 10 includes the cutting apparatus 50. The cutting apparatus 50 is configured to execute the at least one cut AS in the tree 100 for felling the tree 100. Specifically, the cutting device 50 includes a saw, in particular a motor-driven chainsaw.

In addition, the system 10 has an inertial measuring unit 24, a spirit level 25, a compass 26 and a local position determination device 27. In the exemplary embodiment shown, the inertial measuring unit 24, the spirit level 25, the compass 26 and the local position determination device 27 are disposed on the cutting apparatus 50 or in the cutting apparatus 50, as can be seen in FIG. 2. In alternative exemplary embodiments, the inertial measuring unit and/or the spirit level and/or the compass and/or the local position determination device can, in addition or as an alternative, be disposed on the protective helmet, the face shield and/or ear protection, the protective glove, the smartwatch, safety goggles, an armband or a wristband and/or a bracelet. A position POS and an orientation ORS of the cutting apparatus 50 can be identified using the inertial measuring unit 24, the spirit level 25, the compass 26 and the local position determination device 27. In alternative exemplary embodiments, the system can include either the inertial measuring unit or the spirit level or the compass or the local position determination device.

The method further comprises the steps: d) identifying at least a part TST of an, in particular actual, course TSV of a cut TS in the tree 100 for felling the tree 100 during execution thereof and/or identifying the position POS and/or the orientation ORS of the cutting apparatus 50 executing the cut during execution thereof; e) comparing the identified part TST of the course TSV to the obtained part IST of the ideal course ISV of the cut AS to be executed in the tree for felling the tree 100 in the ideal felling direction FR and/or comparing the identified position POS and/or the identified orientation ORS of the cutting apparatus 50 to the obtained ideal position IPOS and/or the obtained ideal orientation IORS of the cutting apparatus 50 for executing the cut AS to be executed; and f) obtaining and outputting cutting information Info' for executing the cut AS based on the comparison during step d). In the exemplary embodiment shown in FIG. 5, the course TSV of the cut TS, in particular of the kerf lower cut FKOS, deviates upwards from the ideal course ISV of the cut AS to be executed. The cutting information Info' includes an instruction to return to the ideal course ISV. In this case, an instruction to return downwards. In particular, the cutting information Info' is projected into the field of view of the forestry worker 90, in particular by means of a downwardly pointing arrow. By returning to the ideal course ZSIV of the cut TS, FKOS it is possible to ensure that the tree 100 cannot sit with the kerf roof on the kerf base during felling and as a result the trunk 101 cannot rip along the longitudinal axis.

The part TST of the course TSV of the cut TS and/or the position POS and/or the orientation ORS of the cutting apparatus 50 can be identified by the above-described techniques for identifying the property EB, EU. The part TST of the course TSV can be obtained based on the identified position PORS and/or the identified orientation ORS of the cutting apparatus 50. A physical expansion or a physical extension of the cutting apparatus 50, in particular an expansion of a guide rail or a chain bar of the saw 50, is taken into account during identification of the position POS and the orientation ORS of the cutting apparatus 50 executing the cut TS using the inertial measuring unit 24, the spirit level 25, the compass 26 and the local position determination device 27.

As is made clear by the exemplary embodiments shown and explained above, the invention provides an advantageous method for assisting during felling of a tree and an advantageous system for assisting during felling of a tree, which method and system each improve safety during felling, make it easier to prevent undesired damage, in particular to the tree, and allow simple further processing of the tree.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for assisting during felling of a tree, the method comprising the steps of:
   a) providing, using a provision device, a property of the tree and/or a property of an environment of the tree;
   b) obtaining, using a determination device, felling information related to an ideal felling direction of the tree based on the provided property;
   c) outputting, using an output device, the obtained felling information;
   d) using the provision device, identifying at least a part of a course of a cut in the tree for felling the tree during execution thereof and/or identifying a position and/or an orientation of a cutting apparatus executing the cut during execution thereof,
   e) using the determination device, comparing the identified part of the course to an obtained part of an ideal course of a cut to be executed in the tree for felling the tree in the ideal felling direction and/or comparing the identified position and/or the identified orientation of the cutting apparatus to an obtained ideal position and/or an obtained ideal orientation of the cutting apparatus for executing the cut to be executed; and
   f) obtaining, using the determination device, and outputting, using the output device, cutting information for executing the cut based on the comparison during step d).

2. The method according to claim 1, wherein the step a) includes: receiving the property.

3. The method according to claim 2, further comprising the step of:
   obtaining a position and/or a marking of the tree, wherein the step a) includes: receiving the property based on the obtained position and/or the obtained marking.

4. The method according to claim 1, wherein, the step a) includes: identifying the property using optical identification, inertial measurement, a spirit level, a compass, local position determination, and/or satellite position determination.

5. The method according to claim 1, wherein the property of the tree is one or more of a geometry of the tree, a surface characteristic of the tree or a tree species of the tree, and/or
   the property of the environment of the tree includes at least one position of at least one adjacent tree, at least one position of at least one hazardous point, at least one position of at least one logging trail, a shape and/or a slope of the environment, a wind direction, and/or a wind speed.

6. The method according to claim 1, wherein the step b) includes: obtaining a free felling area for the tree, a logging direction to a logging trail and/or a felling retreat for a forestry worker based on the provided property, and
   the felling information related to the ideal felling direction of the tree is obtained based on the obtained free area, the obtained logging direction and/or the obtained felling retreat.

7. The method according to claim 1, wherein the felling information includes one or more of:
   the ideal felling direction of the tree,
   at least a part of an ideal course of at least one cut to be executed in the tree for felling the tree in the ideal felling direction, or
   at least one ideal position and/or at least one ideal orientation of a cutting apparatus executing the cut.

8. The method according to claim 1, wherein in step c), the felling information is outputted using optics, acoustics and/or haptics.

* * * * *